April 23, 1957  G. G. ALEXANDER  2,790,069
ILLUMINATED SPIRIT LEVEL
Filed Nov. 22, 1954

INVENTOR
GEORGE G. ALEXANDER

Caswell & Lagaard
ATTORNEYS

United States Patent Office 2,790,069
Patented Apr. 23, 1957

2,790,069

ILLUMINATED SPIRIT LEVEL

George G. Alexander, Sauk Rapids, Minn.

Application November 22, 1954, Serial No. 470,292

1 Claim. (Cl. 240—6.44)

The herein disclosed invention relates to spirit levels and has for an object to provide a level having a plurality of spirit level tubes with illuminating means for simultaneously illuminating all of said tubes.

Another object of the invention resides in providing a level having a body formed with an elongated straight surface and formed with a central cavity therein, with an insert receivable in said cavity and supporting said spirit level tubes, said tubes being arranged near the outermost portion of said cavity and making predetermined angles with said surface, and in further providing an electric light bulb mounted on said body and adapted to be received within said cavity to simultaneously illuminate all of said tubes.

A still further object of the invention resides in providing crescent shaped magnets in the ends of the body and along the denoted surface for supporting the level on ferrous objects while the same is being observed.

Other objects of the invention reside in the novel combination and arrangement of parts and in the details of construction hereinafter illustrated and/or described.

Figure 1:
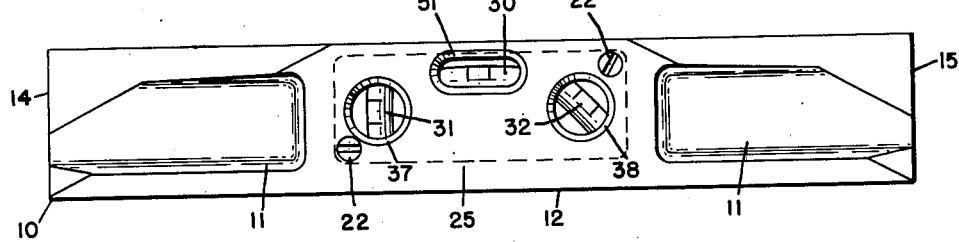
Fig. 1 is an elevational view of a level illustrating an embodiment of the invention.
Figure 2:
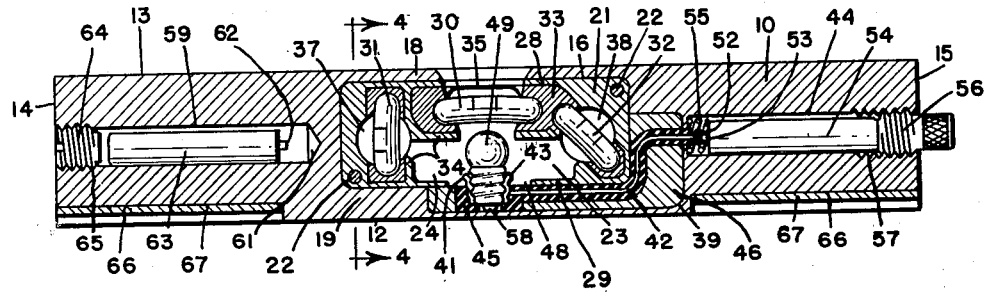
Fig. 2 is an elevational longitudinal sectional view taken substantially through the center of the level and on line 2—2 of Fig. 3.

The invention shown in the drawings consists of an elongated body having at least one straight elongated surface adapted to be applied to the object to be leveled. The body is formed with a central cavity in which is received an insert. The insert likewise has a central cavity and in this cavity is disposed a plurality of spirit level tubes arranged at predetermined different angles with reference to the elongated surface of the body. Mounted on the body and within the cavity therein is an electric light bulb which extends into the cavity in the insert and simultaneously illuminates all of said tubes. An electric battery in one end of the body serves to energize the light bulb. The ends of the body are formed with grooves extending through the denoted surface thereof and in which are disposed crescent shaped magnets adapted to hold the level attached to a ferrous object, the inclination of which is to be observed.

The invention consists of a body 10 of aluminum or some other light material which is formed with recesses 11 for the purpose of reducing the weight of the same. The body 10 is further formed with an elongated straight edge surface 12 which may be a plain surface or a curved surface as desired depending upon the structure to which the level is to be applied. The body 10 is also formed with another surface 13 parallel to the surface 12, with end surfaces 14 and 15 perpendicular to the surfaces 12 and 13 and with lateral surfaces 25 and 26. The level may be placed with either of the surfaces 12 or 13 or the surfaces 14 against the surface of the object the inclination of which is to be observed.

Figure 4:
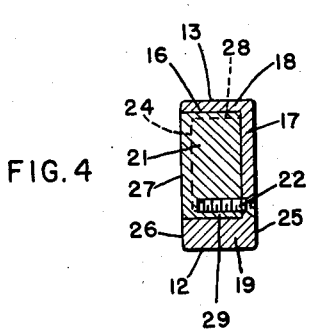
Fig. 4 is a cross sectional view taken on line 4—4 of Fig. 2.
Figure 3:
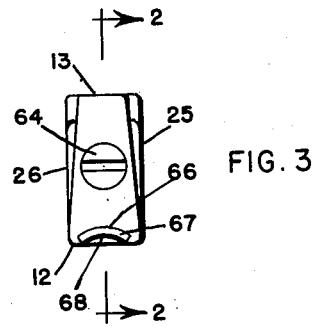
Fig. 3 is an end elevational view of the level viewed from the lefthand end of the level as shown in Figs. 1 and 2.

In the center of the body 10 is formed a cavity 16 which is substantially rectangular in form and which extends through the side 26 of said body, as shown in Fig. 4, and which terminates short of the other side 25 of said body to form a wall 17 bounding said cavity on that side. The said cavity further extends in close proximity to the surfaces 12 and 13 to form walls 18 and 19 bounding the cavity along the edges thereof. An insert 21 is received within the cavity 16 and closely fits the surfaces thereof. This insert is held in place by means of screws 22 which extend through the wall 17 of the body 10 and are screwed into said insert. The insert 21 is formed with a cavity 23 at the center of the same which extends in a direction from the surface 25 and toward the opposite surface 26 to leave a wall 24 between said cavity and the lateral surface 26 of said body thus closing the cavity 16 in said body. The outermost surface 27 of this wall lies flush with the surface 26. The cavity 23 also forms in the insert 21 a wall 28 which lies adjacent the wall 18 of the body 10. Disposed within the cavity 24 of the insert 21 are three spirit level tubes 30, 31 and 32. The spirit level tube 30 is disposed adjacent the wall 28 and is substantially parallel to the surfaces 12 and 13 of body 10. The tube 31 is disposed near one end of the insert 21 and is substantially at right angles to the surfaces 12 and 13 and parallel to the surface 14 of said body. The tube 32 is disposed at the other end of the cavity 23 of the insert and makes an angle of substantially 45° with the surfaces 12, 13 and 14. All of these tubes are attached to the insert 21 by means of a suitable cement 33 which is held in place through projections 34 formed on said insert. The spirit level tubes 30, 31 and 32 are supported solely at their ends and the projections 34 are so arranged that light emanating from the interior of the cavity 24 reaches all of said tubes. Formed in the walls 18 and 28 of the body 10 and insert 21 is an opening 35 which forms a window through which the tube 30 may be viewed. In a similar manner the walls 17 and 24 are formed with openings 51 which provide windows through which the tube 30 may be viewed. Other openings 37 and 38 formed in the walls 17 and 24 of the body 10 and insert 21 form windows through which the tubes 31 and 32 may be viewed.

Formed in the wall 19 of the body 10 and particularly in the body proper is a recess 39 in which is mounted an electric light socket 41. This socket has an insulated wire 42 connected to the shell 43 thereof and which enters a bore 44 formed in the end of the body 10 and opening through the surface 15 of said body. The socket 41 is insulated from the body 10 by means of an insulator 45 and the light socket and wire 42 are secured in recess 39 by means of cement 46. The wall 29 of the insert 21 has a slot 48 in the same and which receives the shell 43 of socket 41. A light bulb 49 screwed into the shell 43 of socket 41 becomes disposed within the cavity 23 in insert 21 and is enclosed by the walls 17 and 24 of the body and insert. This light bulb illuminates all of the tubes 30, 31 and 32 which become readily visible from the exterior through the windows 35, 37, 38 and 51.

The wire 42 terminates in a contact 52 extending into the bore 44 of body 10. This contact is adapted to engage the contact 53 of a battery 54 mounted in the bore 44. A spring 55 engages the end wall of the body 10 at the bottom of the bore 44 and also the end of the battery 54, thus bringing the shell of the battery in electric contact with the body 10. A thumb screw 56 screwed into threads 57 formed in the end of the bore 44 serves to hold the battery in place. This thumb screw also serves as a switch by forcing the contact 53 against the contact 52 and against the action of spring 55. The contact 58 of the light bulb 49 is screwed directly into engagement with the wall 19 of the body 10 and makes electrical contact therewith.

For the purpose of storing a fresh battery, a bore 59 is formed in the opposite end of the body 10 from the bore 44. This bore has a deep countersink 61 at its inner end which prevents the contact 62 of a battery 63 received within said bore from contacting the metal of the body and shorting the battery. A plug 64 screwed into threads 65 at the outer end of the bore 59 holds the spare battery within said bore.

The invention may be conveniently used for leveling pipes used in a steam fitting and in plumbing work. For the purpose of holding the level attached to the pipe, two grooves 66 are formed in the body 10 along the surface 12 and near the surfaces 14 and 15 thereof. These grooves extend through the surface 12. In these grooves are mounted elongated permanent magnets 67 which are crescent-shaped in cross section and which have surfaces on their poles 68 lying flush with the surfaces 12 of the body 10. These magnets may be pressed in place or held in position in any other suitable manner. While the surface 12 has been shown in the drawings as a flat surface, it can readily be comprehended that this surface may be made arcuate to more closely fit the surface of the pipe on which the level is to be placed.

The method of using the invention is obvious. When leveling a pipe, the level is placed with the surface 12 adjacent the pipe and the magnets 67 hold the level in position. By screwing the thumb screw 56, battery 54 is brought into contact with the contact 52 and the electric light bulb lighted. The user can in such condition readily see the indication and proceed with his work. When the battery wears out, the spare battery 63 disposed in bore 59 may be removed and inserted in the bore 44.

The advantages of the invention are manifest. The level is extremely useful and permits the operator to use both hands for purposes other than holding the level. The level tubes are at all times visible and the level can be used in dark places without the user employing a flash light or candle for the purpose. The light being disposed within the confines of the spirit level tubes simultaneously illuminates all of the tubes. Due to the close proximity of the light bulb to the tubes, a small single cell light bulb can be used with ample illumination.

Changes in the specific form of the invention, as herein described, may be made within the scope of what is claimed without departing from the spirit of the invention.

Having described the invention, what is claimed as new and desired to be protected by Letters Patent is:

A level comprising an elongated body formed with elongated edges and sides and having an elongated cavity in the same intermediate its ends and open at one side of said body, said cavity being spaced from the other side of said body and from the edges thereof to form a lateral wall adjacent said side and edge walls adjacent said edges, an insert received within said cavity and having a chamber therein bounded by a lateral wall and edge walls, said lateral wall closing the cavity in said body, an electric light bulb mounted on one of said edge walls of said body and extending into said cavity at a location intermediate its ends, a spirit level tube mounted on said insert and disposed within said chamber adjacent the edge wall of the insert opposite the wall on which the light bulb is mounted, other spirit level tubes disposed in said chamber toward the ends of the insert, each of said tubes forming a different angle with said edges of said body, the denoted edge wall of said insert and the overlying edge wall of the body having registering openings therein serving as windows through which the first named spirit level tube may be viewed, and the lateral walls of said body and insert having openings therein through which the last named tubes may be viewed, the other edge wall of said insert having an opening therein receiving said light bulb and means for energizing said light bulb.

References Cited in the file of this patent

UNITED STATES PATENTS

| | | |
|---|---|---|
| 863,415 | Matthews | Aug. 13, 1907 |
| 1,712,201 | Deneen | May 7, 1929 |
| 1,884,469 | Winter | Oct. 25, 1932 |
| 2,414,653 | Lookholder | Jan. 21, 1947 |
| 2,481,736 | Foerster | Sept. 13, 1949 |
| 2,535,791 | Fluke | Dec. 26, 1950 |
| 2,615,122 | Coombs | Oct. 21, 1952 |
| 2,695,949 | Ashwill | Nov. 30, 1954 |